United States Patent [19]
Mirtain et al.

[11] 4,059,138
[45] Nov. 22, 1977

[54] RUN-FLAT TIRE AND HUB THEREFOR

[75] Inventors: Henri J. Mirtain; Andre M. Devienne, both of Compiegne, France

[73] Assignee: Uniroyal, S.A., Clairoix, France

[21] Appl. No.: 724,047

[22] Filed: Sept. 16, 1976

Related U.S. Application Data

[63] Continuation of Ser. No. 376,983, July 6, 1973, abandoned.

[30] Foreign Application Priority Data

Aug. 11, 1972 France ............................ 72.29183

[51] Int. Cl.$^2$ ............... B60C 17/04; B60C 15/00; B60C 13/00
[52] U.S. Cl. .................. 152/330 RF; 152/158; 152/352 A; 152/353 R; 152/361 R; 152/399
[58] Field of Search ............... 152/352, 353 R, 353 C, 152/354, 330 RF, 379, 381 R, 158, 398, 399, 400, 402, 409

[56] References Cited

U.S. PATENT DOCUMENTS

| | | | |
|---|---|---|---|
| 1,530,574 | 3/1925 | Paull | 152/352 |
| 1,889,799 | 12/1934 | Clark | 152/400 |
| 2,262,780 | 11/1941 | Sherwood | 152/158 |
| 2,482,221 | 9/1949 | Sokolik | 152/330 RF |
| 2,761,489 | 9/1956 | Kraft | 152/353 R |
| 2,789,616 | 4/1957 | Cuthbertson et al. | 152/353 R |
| 3,253,635 | 5/1966 | Travers | 152/354 |
| 3,554,261 | 1/1971 | Mirtain | 152/361 FP |
| 3,610,310 | 10/1971 | Wittneben | 152/330 RF |
| 3,638,704 | 2/1972 | Boileau | 152/353 R |
| 3,841,375 | 10/1974 | Edwards | 152/330 RF |
| 3,983,918 | 10/1976 | French | 152/330 RF |

FOREIGN PATENT DOCUMENTS

| | | | |
|---|---|---|---|
| 1,327,812 | 4/1963 | France | 152/352 |

*Primary Examiner*—Drayton E. Hoffman
*Attorney, Agent, or Firm*—Jack Posin

[57] ABSTRACT

A pneumatic vehicle tire having a run-flat capability and a hub adapted for use with such a tire are disclosed. The tire includes a carcass, a tread overlying the crown region of the carcass, sidewalls overlying the lateral portions of the carcass, the sidewalls terminating in respective beads at their radially inwardmost ends and merging into the tread at their radially outwardmost ends and an annulus of elastomeric material positioned between the inner surfaces of the beads for maintaining the beads in firm contact with the hub. Each of the sidewalls has an annular groove formed therein between its inwardmost and outwardmost ends for establishing the flexure zone of the tire and thereby controlling the folding point of the tire upon its deflation. The hub includes a rigid annulus, a first annular flange extending from one side of the annulus and permanently attached thereto and the second annular flange extending from the other side of the annulus, the second flange being removably attached to the annulus. One surface of each of the first and second flanges is contoured so that it conforms to the beads of the tire and substantially conforms to the radially inward portions of the sidewalls upon deflation o the tire. This abstract is not to be taken either as complete exposition or as a limitation of the present invention, however, the full nature and extent of the invention being discernable only by reference to and from the entire disclosure.

14 Claims, 6 Drawing Figures

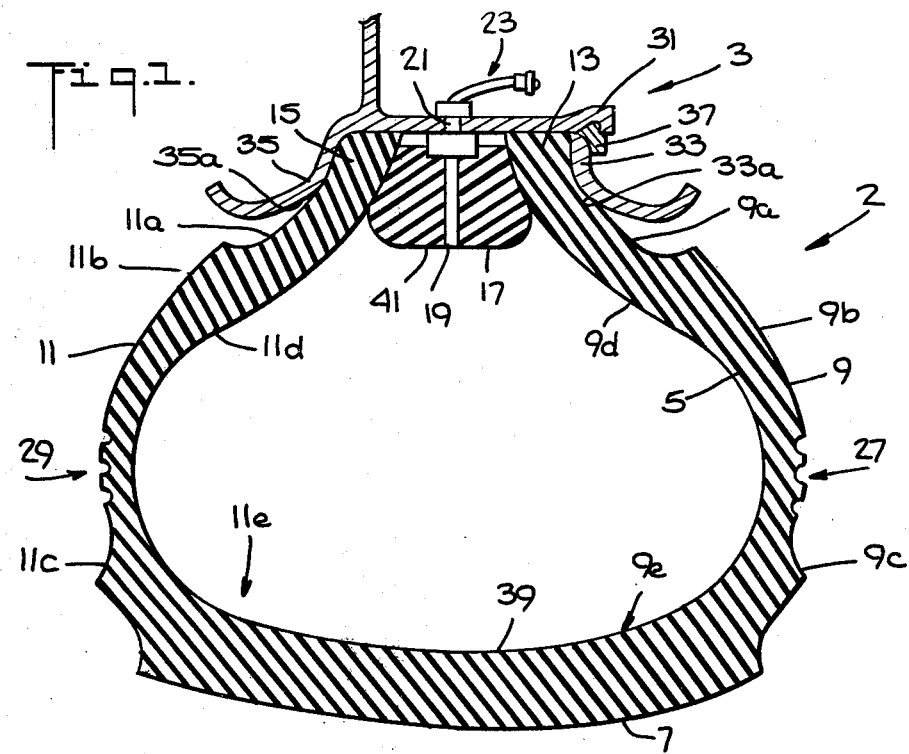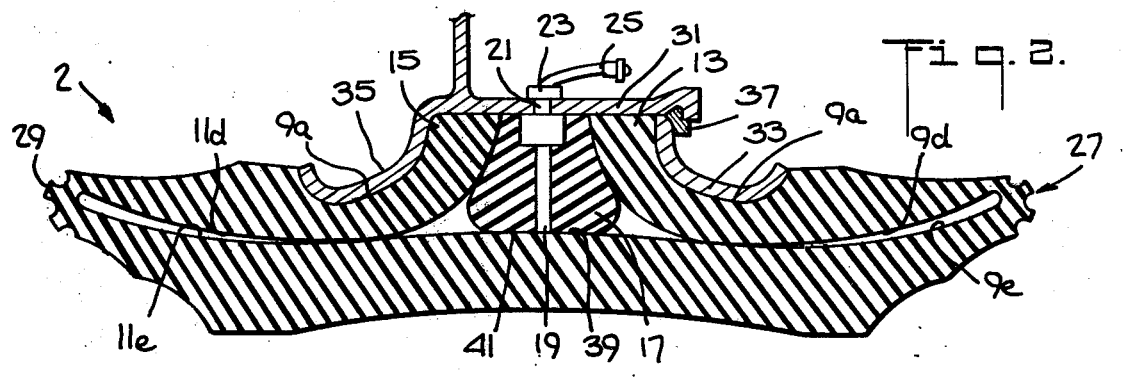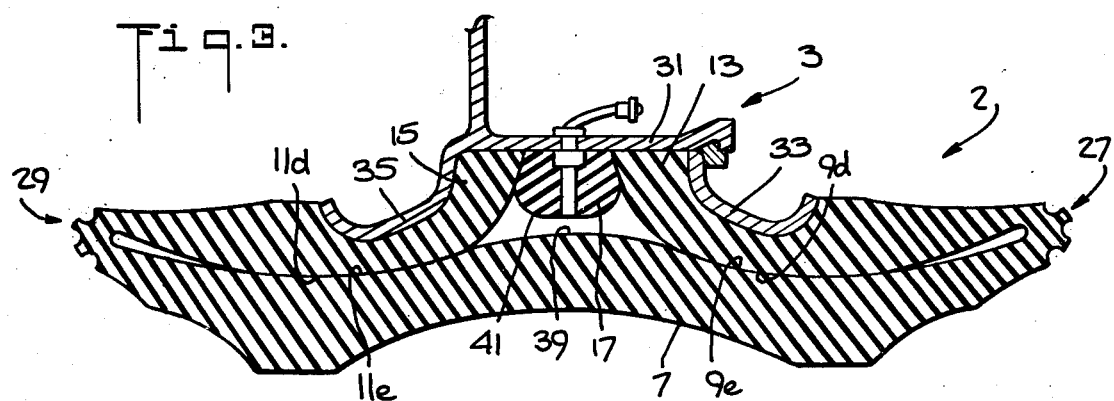

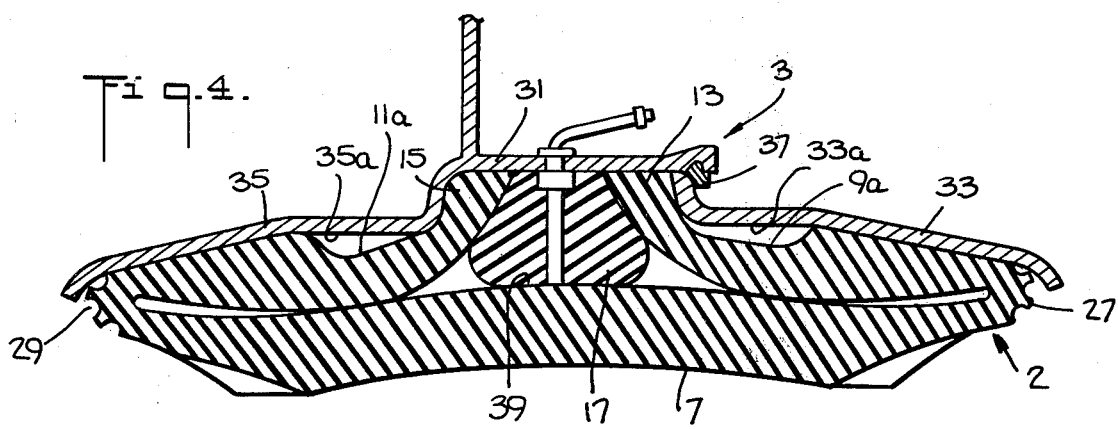
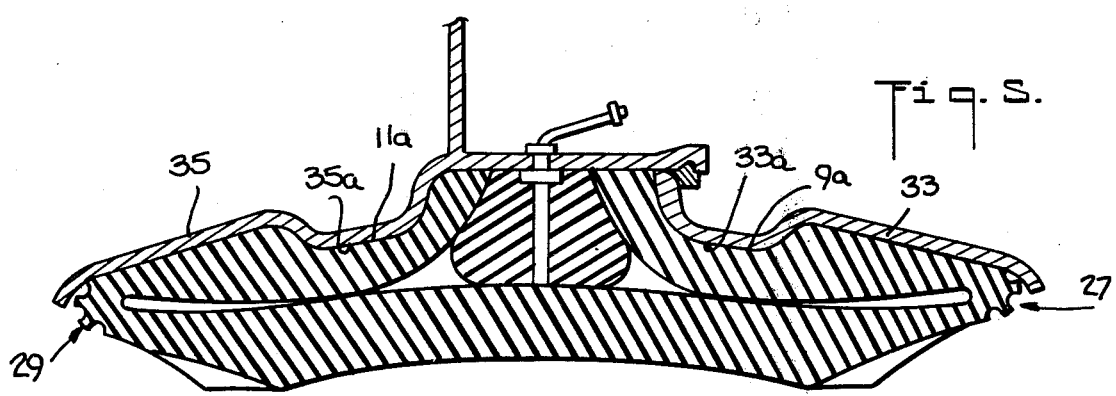
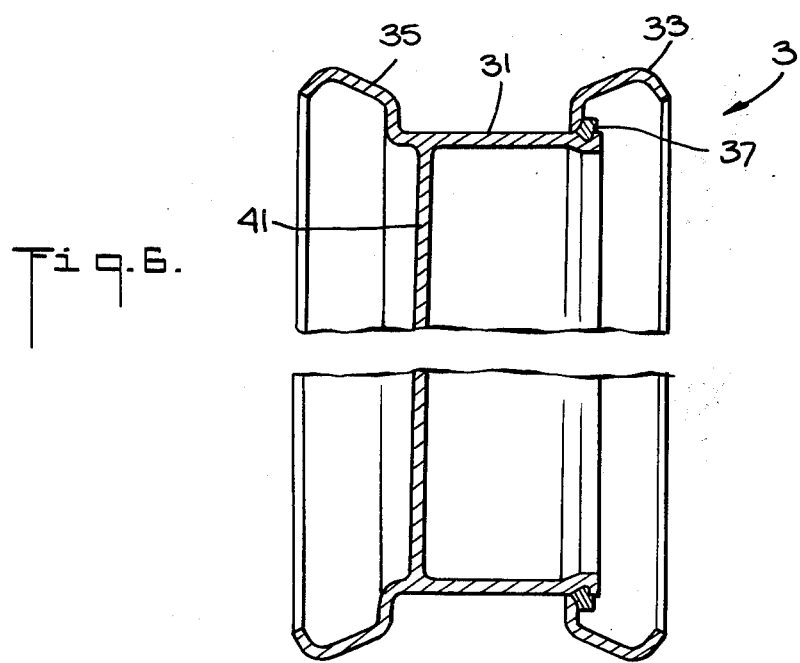

RUN-FLAT TIRE AND HUB THEREFOR

This is a continuation of application Ser. No. 376,983, filed July 6, 1973, now abandoned.

BACKGROUND OF THE INVENTION

This invention relates to pneumatic tires for vehicles and more particularly to such tires having a runflat capability and to the hubs adapted for use with such tires.

Presently known automobile tires are generally quite reliable. When, however, they do fail, they become a source of substantial difficulty. Thus, when air is lost from a tire, due either to a puncture of the tire by a foreign body or to a blow-out of the tire, both of which result in the tire becoming "flat", it becomes necessary to change the tire for a "spare" which is customarily carried in the vehicle. The changing of a tire can be a dangerous operation. For example, if it is necessary to change a tire while the vehicle is on a roadway, the person changing the tire is exposed to, and runs a substantial risk of being struck by, other vehicles on the road. Furthermore, after jacking up the vehicle so that the tire may be changed, it is possible for the jack to slip or for the vehicle itself to roll, thereby causing physical injury to the tire changer. If on the other hand the driver of the vehicle does not wish to expose himself or his passengers to the possibility of such injury, the driver may attempt to drive onward while the flat tire remains on the vehicle until he reaches a safe place to change the tire or until he reches an auto service station where the tire will be repaired and replaced for him. This however, frequently results in the complete destruction of the tire, and possibly of the hub on which the tire is mounted as well. The destruction of the tire may be caused by the heat resulting from the chafing of the inner portions of the tire against one another, the coefficient of friction of dry rubber being quite high. The heat generated in this manner causes rapid tire cord deterioration and thus rapid tire destruction. The destruction of the tire may also be caused by the slippage of the tire on the hub which allows the flanges or rims of the metal hub to be ground into the tire, thereby tearing and cutting the tire. The metal hub may be damaged beyond repair by being deformed under the weight of the vehicle as the hub rolls along the surface of the road, the shock absorbing capacity of the air filled tire no longer being available to protect the hub.

In an attempt to overcome the above-noted difficulties, tires having an annular lining constituted by an elastomeric material positioned in the central portion of the hub have been provided. The purpose of the lining is two-fold, one reason being to clamp the beads of the tire between the lining and the rims or the flanges of the hub, thereby preventing the detachment of the tire from the hub following tire failure, and the second reason being to provide support for the radially inner central tread portion of the tire, thereby causing the tire to be relatively stable. This solution, however, is not completely satisfactory because the stability of the tire is dependent upon driving the vehicle at a slow speed and then only for a short distance. If an operator attempts to drive at a moderate rate of speed, or at a slow speed but over an extended distance, it has been found that the tire will oscillate perpendicularly to the direction of vehicle travel, resulting in the separation of the tire from the hub or otherwise causing the destruction of the tire.

SUMMARY OF THE INVENTION

It is, therefore, an important object of the present invention to provide a pneumatic vehicle tire having a run-flat capability and a hub adapted for use with such a tire by means of which the aforesaid drawbacks and disadvantages may be most efficaciously avoided.

It is a further object of this invention to provide a pneumatic vehicle tire having a run-flat capability which is not subject to lateral oscillations when in service while deflated.

It is yet another object of this invention to provide a pneumatic vehicle tire having a run-flat capability which is not subject to separation from the hub when in service while deflated.

It is still another object of this invention to provide a pneumatic vehicle tire having a run-flat capability which can be run at conventional road speeds while deflated without destruction of the tire.

It is yet a further object of this invention to provide a pneumatic vehicle tire having a run-flat capability which can be run for tens of miles while deflated without destruction of the tire.

It is yet another object of the invention to provide a hub adapted for use with a pneumatic vehicle tire having a run-flat capability.

It is still another object of the invention to provide a vehicle wheel constituted by a pneumatic tire having a run-flat capability and a hub structure cooperating therewith.

According to one aspect of the invention there is provided a pneumatic vehicle tire having a run-flat capability adapted to be mounted on a hub comprising a carcass, a tread overlying the crown region of the carcass in circumferentially surrounding relation to the latter, first and second sidewalls overlying the lateral portions of said carcass, the first and second sidewalls terminating in first and second beads respectively at their radially inwardmost ends and merging into the tread at their radially outwardmost ends, each of the sidewalls having an annular groove formed therein interjacent its radially inwardmost and outwardmost ends for establishing the flexure zone of the tire and thereby controlling the folding point of the tire upon its deflation, and an elastomeric annulus positioned between the axially inner surfaces of the first and second beads for maintaining the beads in firm contact with the hub.

According to another aspect of the invention there is provided a hub adapted for use with a pneumatic vehicle tire having a run-flat capability comprising a rigid annulus, a first annular flange extending from one side of the annulus and permanently affixed thereto, and a second annular flange extending from the second side of the annulus and removably affixed thereto, one surface of each of the first and second flanges being contoured to conform to the first and second beads respectively of the tire and to substantially conform to the radially inward portions of the first and second sidewalls respectively of the tire upon the deflation thereof.

According to yet another aspect of the invention there is provided a vehicle wheel constituted by a pneumatic tire having a run-flat capability and a hub on which the tire is mounted comprising a carcass, a tread overlying the crown region of the carcass in circumferentially surrounding relation to the latter, first and second sidewalls overlying the lateral portions of the carcass, the first and second sidewalls terminating in first and second beads respectively at their radially inwardmost ends and merging into the tread at their radially outwardmost ends, each of the sidewalls having an annular groove formed therein interjacent its radially inwardmost and outwardmost ends for establishing the flexure zone of the tire and thereby controlling the folding point of the tire upon its deflation, a rigid annulus, a first annular flange extending from one side of the annulus and permanently affixed thereto, a second annular flange extending from the second side of the annulus and removably affixed thereto, one surface of each of the first and second flanges being contoured to conform to the first and second beads respectively of the tire and to substantially conform to the radially inward portions of the first and second sidewalls respectively of the tire upon deflation thereof, and an elastomeric annulus positioned between the axially inner surfaces of the first and second beads for maintaining the beads in firm contact with the one surface of each of the first and second flanges respectively.

BRIEF DESCRIPTION OF THE DRAWINGS

The foregoing and other objects and features of the present invention will be more clearly understood from the following detailed description thereof when read in conjunction with the accompanying drawings, in which:

FIG. 1 is a transverse or radial cross-sectional view of a tire and hub according to the invention, the tire being in its inflated condition;

FIG. 2 is a radial or transverse cross-sectional view of the tire and hub illustrated in FIG. 1, the tire being in its deflated condition;

FIGS. 3, 4 and 5 are radial cross-sectional views similar to FIG. 2 which illustrate alternative embodiments of the inventive tire and hub; and FIG. 6 is a cross-sectional view of a hub according to the instant invention.

DESCRIPTION OF THE PREFERRED EMBODIMENT

Referring now to FIG. 1 there is illustrated a tire indicated generally at 2 mounted on a hub indicated generally at 3, the tire 2 including a carcass 5, a tread 7 overlying the crown region of the carcass, sidewalls 9 and 11, the sidewalls 9 and 11 terminating in beads 13 and 15 respectively at their radially inwardmost ends and in the tread 7 at their radially outwardmost ends. The tire 2 further includes a stabilizing means in the form of a ring or annulus 17 of an elastomeric material positioned between the axially inner surfaces of beads 13 and 15. The annulus 17 is formed with an air passage 19 therein, passage 19 being aligned with an aperture 21 formed in the hub 3 and a conventional valve and stem combination 23 is coupled to the hub 3 and surrounds the aperture 21 thereby allowing the inflation of the tire 2 in the customary manner. As illustrated in FIG. 1, the sidewalls 9 and 11 are shaped so that their axially outwardmost positions are generally intermediate the radially inwardmost and outwardmost portions of the sidewalls and the axially outwardmost portions extend axially outwardly of the axially outwardmost portions of the tread 7. The sidewalls 9 and 11 each have at least one annular groove, indicated at 27 and 29, respectively, formed therein. The grooves 27 and 29 are located between beads 13 and 15 and tread 7 and, in the tire illustrated in FIG. 1, are generally intermediate the radially inwardmost and outwardmost ends of the respective sidewalls. The grooves establish the flexure zone of the tire, i.e., the point at which the tire will fold upon its deflation.

The hub 3, which may be made of metal or other rigid materials, includes a rigid annulus or ring 31 and flanges 33 and 35. The flange 35 extends from one side or annulus 31 and is permanently affixed thereto, and the flange 33 extends from the other side of annulus 31 and is removably affixed thereto by means of an annular wedge 37 which is positioned between the flange 33 and the rigid annulus 31.

Turning now to FIG. 2, there is illustrated the same tire and hub structure as is shown in FIG. 1 above, the tire in this instance however being illustrated in its deflated condition. It is here appropriate to note that with regard to the present discussion of FIG. 2, as well as with regard to the subsequent discussion of FIGS. 3–6, corresponding portions of the tire and hub structure will be indicated by corresponding numerals, these numerals corresponding also to those utilized in FIG. 1 above. Referring again to FIG. 2, it is seen that when tire 2 is in its deflated condition the annular flanges 33 and 35 are accomodated by, and fit into, concave recesses which are formed in the radially inward portions of sidewalls 9 and 11, respectively, these recesses being indicated at 9a and 11a, respectively. As seen in FIG. 2, the recesses 9a and 11a extend axially and radially outward from the regions of the beads 13 and 15, respectively, and the recesses are contoured so that they conform substantially to the flanges 33 and 35, respectively, only when the tire 2 is deflated, the flanges 33 and 35 standing away from the recesses 9a and 11a, respectively, when the tire is inflated, as illustrated in FIG. 1. The inner central portion 39 of carcass 5 rests against, and is supported by, the radially outward surface 41 of elastomeric annulus 17. Grooves 27 and 29 formed in sidewalls 9 and 11, respectively, define, as previously noted, the flexure or folding zones of the tire. As seen in FIG. 2, the grooves 27 and 29 allow each of the sidewalls to fold axially outwardly along sharply defined annular lines upon deflation of the tire. This establishment of the folding zone of the tire, which improves the lateral stability of the tire when it is in service while deflated, combined with the fact that the elastomeric annulus 17 maintains the beads 13 and 15 in position and stable relative to the hub 3, results in a structure which may be driven after failure at moderate road speeds, over extended distances, and in complete safety, without destroying either the tire or the hub on which the tire is mounted. It is here appropriate to note that when repair of the tire 2 is required, it may easily be removed from hub 3. This is so, notwithstanding the fact that annulus 17 urges beads 13 and 15 against hub 3, because flange 33 is removably affixed to annulus 31 by annular wedge 37, and the desired removal of the tire from the hub requires only the prior separation of the flange 33 from the annulus 31.

Turning now to FIG. 3, there is illustrated an alternative embodiment of the instant invention. In this embodiment the elastomeric annulus 17 has a smaller radius than the embodiment illustrated in FIG. 2, and thus, upon deflation of the tire the elastomeric annulus illustrated in FIG. 3 does not come into contact with, nor does it support, the inner central portion 39 of carcass 5. The function of the annulus 17 in this embodiment is solely to urge beads 13 and 15 against the rigid annulus 31 and the flanges 33 and 35, thereby preventing the tire from separating from hub 3 while the tire is in service while deflated. The utilization of the elastomeric annulus illustrated in FIG. 3 allows tread 7 of tire 2 to arch radially upward to a greater degree, that is, have a greater concavity, than the tire illustrated in FIG. 2 thereby providing the tire with improved lateral stability when it is in service while deflated. Further, the lack of support of the inner central portion 39 of carcass 5 by surface 41 of annulus 17 is to at least some extent compensensated for by the increased support provided to the interior portions of the carcass 5 which are indicated at 9e and 11e by the interior portions which are indicated at 9d and 11d, respectively. Thus, it is seen that due to the aforementioned increase in concavity, there is contact between a greater portion of the surfaces 9d and 9e, and between surfaces 11d and 11e in the embodiment illustrated in FIG. 3 than there is in the embodiment of the invention illustrated in FIG. 2. It is thus seen that as discussed above with regard to FIG. 2, and for substantially the same reasons, this embodiment also provides a stable structure which may safely remain in service after failure.

Referring now to FIG. 4 there is illustrated a tire 2 including an elastomeric annulus 17, which is identical to the tire structure illustrated in FIGS. 1 and 2. The hub 3 here illustrated however is an alternative embodiment according to the invention. The primary distinction between the hub here illustrated and the hub previously illustrated in FIGS. 1 and 2 is that here flanges 33 and 35 extend, in an axial direction, substantially beyond sidewall recesses 9a and 11a. When, as here illustrated, the tire is deflated, the flanges 33 and 35 extend axially outward from beads 13 and 15 respectively to a point proximate the folding or flexure zone of tire 2 which, as previously noted, is determined by the annular grooves indicated at 27 and 29. It will of course be realized that in this embodiment, when the tire is in its inflated condition, the flanges 33 and 35 will extend, in an axial direction, substantially beyond the sidewalls 9 and 11. It will further be noted that the axially inner surfaces of flanges 33 and 35, indicated at 33a and 35a, respectively, are not contoured to precisely conform to recesses 9a and 11a of sidewalls 9 and 11, respectively, when tire 2 is deflated. The surfaces 33a and 35a however do conform to the axially outer portions of beads 13 and 15, respectively, and also to the major portion of the radially inward sections of sidewalls 9 and 11, respectively, i.e., those portions of sidewalls 9 and 11 which lie between recess 9a and groove 27 and between recess 11a and groove 29. It is thus seen that although in this embodiment the radially inward sidewall portions are not completely supported by flanges 33 and 35, the tire 2 is nevertheless stable at moderate speeds and over extended distances due to the substantial support and stability provided by the flanges 33 and 35 and by the elastomeric annulus 17.

Turning now to FIG. 5 there is illustrated a tire and hub structure similar to that illustrated in FIG. 4 above, the only distinction being that flanges 33 and 35, and more particularly portions 33a and 35a of flanges 33 and 35, respectively, are so contoured that they conform precisely to sidewall recesses 9a and 11a respectively, thereby providing further support for the tire in its deflated condition and therefore a somewhat greater degree of stability to the tire when it is in service while deflated.

Referring now to FIG. 6 there is shown a cross-sectional view of a hub adapted for use with a pneumatic vehicle tire having a run-flat capability, this hub corresponding to the embodiment partially illustrated in FIGS. 1 - 3. As previously noted, hub 3 includes the rigid annulus 31, and a rigid annular plate 41 positioned at the interior of, and adjacent to, one side of the annulus 31. The annular flange 35 is formed integrally with the rigid annulus 31 and the annular flange 33 is removably connected or affixed to the rigid annulus 31, the annular flange 33 being maintained in position relative to the rigid annulus 31 by the annular wedge 37. Of course any other suitable affixing or attaching means could be used in place of wedge 37. For example, flange 33 might be formed with an annular lip and annulus 31 might be formed with an annular groove with which the lip of flange 33 would mesh.

It will be understood that the foregoing description of the preferred embodiments of the present invention are for purposes of illustration only, and that the various structural and operational features herein disclosed are susceptible to a number of modifications and changes none of which entail any departure from the spirit and scope of the present invention as defined in the hereto appended claims.

Having thus described the invention, what is claimed and desired to be protected by letters patent is:

1. A vehicle wheel constituted by a pneumatic tire having a run-flat capability and a hub on which said tire is mounted comprising:

a carcass;

a tread overlying the crown region of said carcass in circumferentially surrounding relation to the latter;

first and second sidewalls overlying the lateral portions of said carcass, said first and second sidewalls terminating in first and second beads respectively at their radially inwardmost ends and merging into said tread at their radially outwardmost ends, the axially outwardmost portions of said sidewalls being generally intermediate the radially inwardmost and outwardmost ends thereof and extending axially outwardly of the axially outwardmost portions of said tread, each of said sidewalls having an annular groove formed therein generally intermediate its radially inwardmost and outwardmost ends for folding each of said sidewalls axially outwardly along sharply defined annular lines upon deflation of the tire, said grooves being formed at locations in said sidewalls corresponding to the axially outwardmost portions of said sidewalls when the tire is deflated under load, said grooves dividing said sidewalls along said sharply defined annular line each into a radially inner portion and a radially outer portion that in a predetermined contour are mutually engageable with one another when the tire is deflated under load;

stabilizing means interposed between the bead portions of said sidewalls for preventing inadvertent axial displacement of said bead portions of said sidewalls relative to one another and said hub when the tire is deflated under load, said stabilizing means bridging said bead portions of said sidewalls and cooperating therewith to provide for an axially stable unit that serves to minimize axial displacement of said radially outer portions of said sidewalls relative thereto and lateral oscillation of the tire when it is deflated under load and run flat, each of said sidewalls having an annular recess formed therein, said recesses extending axially and radially outward from the bead regions of the tire;

a rigid annulus;

a first annular flange extending from one side of said annulus; and a second annular flange extending from the second side of said annulus, one surface of each of said first and second flanges being contoured to conform to the first and second beads, respectively, of said tire and to substantially conform to the annular recesses formed in the first and second sidewalls, respectively, of said tire only upon deflation of said tire.

2. A vehicle wheel according to claim 1 further comprising an annular wedge positioned between said rigid annulus and said second flange, thereby removably affixing said second flange to said rigid annulus.

3. A vehicle wheel according to claim 1 wherein said first and second annular flanges have generally U-shaped cross-sections.

4. A vehicle wheel according to claim 1 wherein said first and second annular flanges have generally L-shaped cross-sections.

5. A vehicle wheel according to claim 3 wherein said flanges extend to a point axially inward of the axially outwardmost portion of said tire.

6. A vehicle wheel according to claim 4 wherein said flanges extend to a point axially outward of the axially outwardmost portion of said tire.

7. A vehicle wheel as described in claim 1 further comprising an elastomeric annulus constituting said stabilizing means positioned between the axially inner surfaces of said first and second beads for maintaining said beads in firm contact with said one surface of each of said first and second flanges, respectively.

8. A vehicle wheel according to claim 7 wherein said elastomeric annulus extends in the radially outward direction a distance sufficient to cause it to contact and support the inner crown portion of said carcass when said tire is deflated.

9. A vehicle wheel as described in claim 1 wherein each of said sidewalls is folded sufficiently to enable the interior surfaces of the generally radially inward regions thereof to come into contact with, and be supported by, the respective generally axially outer portions of the interior surface of the crown region of said carcass.

10. A pneumatic vehicle tire having a run-flat capability adapted to be mounted on a hub comprising:

a carcass;

a tread overlying the crown region of the carcass in circumferentially surrounding relation to the latter;

first and second sidewalls overlying the lateral portions of said carcass, said first and second sidewalls terminating in first and second beads, respectively, at their radially inwardmost ends and merging into said tread at their radially outwardmost ends, the axially outwardmost portions of said sidewalls being generally intermediate the radially inwardmost and outwardmost ends thereof and extending axially outwardly of the axially outwardmost portions of said tread, each of said sidewalls having an annular groove formed therein generally intermediate its radially inwardmost and outwardmost ends for folding each of said sidewalls axially outwardly along sharply defined annular lines upon deflation of the tire, each of said sidewalls having an annular recess formed therein, said recesses extending axially and radially outward from the bead regions of the tire and being contoured so as to substantially conform to and engage flange portions on said hub only when said tire is deflated, said grooves being formed at locations in said sidewalls corresponding to the axially outwardmost portions of said sidewalls when the tire is deflated under load, said grooves dividing said sidewalls along said sharply defined annular line each into a radially inner portion and a radially outer portion that in a predetermined contour are mutually engageable with one another when the tire is deflated under load;

and stabilizing means interposed between the bead portions of said sidewalls for preventing inadvertent axial displacement of said bead portions of said sidewalls relative to one another and said hub when the tire is deflated under load, said stabilizing means bridging said bead portions of said sidewalls and cooperating therewith to provide for an axially stable unit that serves to minimize axial displacement of said radially outer portions of said sidewalls relative thereto and lateral oscillation of the tire when it is deflated under load and run flat.

11. A pneumatic vehicle tire according to claim 10 wherein said annular groove is formed in the exterior surface of each of said sidewalls.

12. A pneumatic vehicle tire according to claim 10 wherein each of said sidewalls is folded sufficiently to enable the interior surfaces of the generally radially inward regions thereof to come into contact with, and be supported by, the respective generally axially outer portions of the interior surface of the crown region of said carcass.

13. A pneumatic vehicle tire according to claim 10 wherein said stabilizing means includes an elastomeric annulus positioned between the axially inner surfaces of said first and second beads for maintaining said beads in firm contact with said hub.

14. A penumatic vehicle tire according to claim 13 wherein said elastomeric annulus extends in the radially outward direction a distance sufficient to cause it to contact and support the inner crown portion of said carcass when said tire is deflated.

* * * * *